(12) United States Patent
Chevalier et al.

(10) Patent No.: US 8,122,638 B2
(45) Date of Patent: Feb. 28, 2012

(54) MULTILAYER FILM

(75) Inventors: Sebastien G. Chevalier, Roquefort les Pins (FR); Hailan Guo, Warrington, PA (US); Jiun-Chen Wu, Princeton Junction, NJ (US)

(73) Assignee: Rohm and Haas Company, Philadelphia, PA (US)

( * ) Notice: Subject to any disclaimer, the term of this patent is extended or adjusted under 35 U.S.C. 154(b) by 488 days.

(21) Appl. No.: 12/316,039

(22) Filed: Dec. 9, 2008

(65) Prior Publication Data

US 2009/0165371 A1 Jul. 2, 2009

Related U.S. Application Data

(60) Provisional application No. 61/009,170, filed on Dec. 26, 2007.

(51) Int. Cl.
*A01G 9/14* (2006.01)
*B32B 27/08* (2006.01)

(52) U.S. Cl. ...... 47/17; 428/424.7; 428/424.8; 428/336; 428/520

(58) Field of Classification Search ............ 428/336, 428/424.7, 424.8, 515, 520; 47/17
See application file for complete search history.

(56) References Cited

U.S. PATENT DOCUMENTS

| | | | | |
|---|---|---|---|---|
| 2,464,826 | A | * | 3/1949 | Neher et al. ............ 428/501 |
| 3,310,458 | A | * | 3/1967 | Mattimoe et al. ........ 428/451 |
| 3,562,235 | A | | 2/1971 | Ryan |
| 3,812,205 | A | | 5/1974 | Dunkelberger |
| 3,843,753 | A | | 10/1974 | Owens |
| RE29,772 | E | * | 9/1978 | Niederhauser et al. ........ 525/440.072 |
| 4,141,935 | A | | 2/1979 | Dunkelberger |
| 4,663,213 | A | | 5/1987 | Bailey et al. |
| 4,731,414 | A | * | 3/1988 | Ting ................... 525/71 |
| 2006/0008642 | A1 | * | 1/2006 | Marot et al. .............. 428/334 |
| 2009/0017287 | A1 | * | 1/2009 | Guo et al. ................ 428/327 |

FOREIGN PATENT DOCUMENTS

| | | |
|---|---|---|
| JP | 1983163655 | 3/1985 |
| JP | 1992213348 | 2/1994 |
| JP | 1992331145 | 6/1994 |
| JP | 1999077939 A | 3/1999 |
| JP | 2001017000 A | 1/2001 |
| JP | 2001262132 A | 9/2001 |
| JP | 2003180169 A | 7/2003 |
| WO | WO0247908 | 6/2002 |

* cited by examiner

*Primary Examiner* — Thao T. Tran
(74) *Attorney, Agent, or Firm* — Stephen T. Falk

(57) ABSTRACT

This invention relates to multilayer films and structures such as greenhouses and agricultural tunnels covered in such films.

5 Claims, No Drawings

MULTILAYER FILM

This invention claims priority to U.S. Provisional Application No. 61/009,170 filed Dec. 26, 2007.

This invention relates to multilayer films, particularly those useful for outdoor applications especially for covering greenhouses and agricultural tunnels (e.g., high tunnels).

Greenhouses and agricultural tunnels provide environments that can be more favorable in which plants can grow. An important aspect to such structures is the covering material through which sunlight is provided to the plants inside. Various covering materials have been used including glass, polyethylene film, flexible polyvinylchloride (PVC) film, rigid polycarbonate sheet, rigid polymethacrylate sheet, and other flexible films. Of the flexible films polyethylene and polyvinylchloride (particularly the former) predominate due to low cost and adequate mechanical properties (tear resistance, elongation, etc).

Unfortunately polyethylene film is hazy and has reduced light transmittance and degrades rapidly under exposure to light. Even with light stabilizer additives lifetime is limited. Thus the market needs a greenhouse film that has high light transmittance, good physical properties, good light stability and extended lifetime.

Acrylic films used as cappings for vinyl window profiles, siding, or furnitures have excellent transparency. However such films do not have adequate mechanical properties required for greenhouse or agricultural tunnel covering materials, because many acrylic films are lack of flexibility and have weak tear strength. Accordingly acrylic films are typically used in films suitable for lamination on fixed substrates as protective layers (see, e.g., U.S. Pat. Nos. 4,663,213, 4,141, 935, 3,562,235, 3,843,753 and 3,812,205).

JP1999077939A discloses a greenhouse film made with a thermoplastic polyurethane coated on each side with a waterborn coating composition containing an acrylic (co)polymer made with methylmethylacrylate.

This invention is a multilayer film comprising:

(a) a first outer layer comprising a polymer composition selected from groups (i) or (ii) below or combinations of (i) and (ii), wherein composition (i) comprises from about 10 to 96 weight percent of a (co)polymer of 80 to 100 mole percent $C_1$ to $C_4$ alkyl methacrylate and from 0-40 mole percent of a monomer selected from $C_1$ to $C_8$ alkyl acrylate, styrene, substituted styrene, acrylonitirle, substituted acrylonitrile or combinations thereof, and about 90 to 4 weight percent of an impact resistant resin;

composition (ii) comprises a first through a fourth stage polymer composite wherein the first elastomeric, relatively soft first-stage polymer is polymerized from an aqueous emulsified monomer system containing from about 75-99.8 weight percent of at least one $C_1$ to $C_8$ alkyl acrylate and about 0.1-5 weight percent of at least one crosslinking polyethylenically unsaturated monomer, the balance to total 100 weight percent of first-stage monomer system comprising one or more copolymerizable monoethylenically unsaturated monomers, and the monomer system being chosen so that the maximum glass transition temperature is not over −20° C.;

the second-stage polymer is polymerized, in the presence of the resultant aqueous system from the first-stage polymerization, from an aqueous emulsified monomer system containing about 10-90 weight percent of at least one $C_1$ to $C_8$ alkyl acrylate, and 9-89.9 weight percent of at least one $C_1$ to $C_4$ alkyl methacrylate;

wherein the third-stage polymer is polymerized, in the presence of the resultant aqueous system from the second-stage polymerization from an aqueous emulsified monomer system containing about 5-40 weight percent of at least one $C_1$ to $C_8$ alkyl acrylate and about 95-60 weight percent of at least one $C_1$ to $C_4$ alkyl methacrylate; and the fourth-stage polymer is polymerized, in the presence of the resultant aqueous system from the third-stage polymerization, from an aqueous emulsified monomer system containing about 80-100% weight percent of at least one $C_1$ to $C_4$ alkyl methacrylate and the balance, to total 100 weight percent of the fourth-stage monomer system, of at least one $C_1$ to $C_8$ alkyl acrylate; the weight of the first-stage monomer system being about 10-75% of the total weight of the polymer composition and the weight of the subsequent stages being about 90-25% of the total weight of the polymeric composition, wherein into each of the first- and second-stage monomer systems from about 0.1 to 1 weight percent of at least one graftlinking monomer is incorporated wherein the graftlinking monomer is a copolymerizable monomer containing at least two addition polymerizable unsaturated functional groups, each of which polymerize at substantially different rates with respect to each other;

(b) a core layer selected from a thermoplastic polyurethane or polyvinyl butryal; and (c) a second outer layer selected from (i) or (ii) or combinations thereof.

We found that a multilayer film comprising a layer comprising a polymeric acrylic of compositions (i) or (ii) (or both) on either side of a core layer of a layer comprising a polymer selected from a thermoplastic polyurethane and polyvinylbutyral provides a film with excellent light transmittance and physical properties that is suitable for greenhouse or agricultural tunnel covering material.

This invention also is a greenhouse or agricultural tunnel covered with a film of this invention.

By "film" we mean a polymeric sheet that is less than about 300 micrometer total thickness. We prefer that each of the outer layers be from about 20 to about 100 micrometer thick, and the core layer be from about 20 to about __200 micrometer thick.

Plasticizers suitable for use in the outer layers of the film of this invention could be both monomeric and polymeric ones which include but not limited to phthalate-based such as bis(2-ethylhexyl) phthalate (DEHP), diisononylphthalate (DINP), bis(n-butyl)phthalate (DNBP), butyl benzyl phthalate (BBzP), diisodecyl phthalate (DIDP), di-n-octyl phthalate (DOP), diethyl phthalate (DEP), butyl octyl phthalate (BOP), benzoates such as propylene glycol dibenzoate (PGDB), dipropylene glycol dibenzoate (DPGDB), diethylene glycol dizenzoate/dipropylene glycol dizenzoate, aliphatic dibasic acid esters such as di-2-ethylhexyl adipate (DEHA), dimethyl adipate (DMAD), diissoctyl adipate (DIOA), diisononyl adipate (DINA), monomethyl adipate (MMAD), maleate based such as dibutyl maleate (DBM), diisobutyl maleate (DIBM), trimellitates such as tri-2-ethylhexyl trimellitate (TOTM), triisooctyl trimellitate (TIOTM), trisiononyl trimellitate (TINTM), expoxidized vegetable oils, glycols, and polymeric plasticizers such as acrylic oligomers, etc.

"Glass transition temperature" or "$T_g$" is the glass transition temperature, of a copolymer calculated with the Fox equation [*Bulletin of the American Physical Society* 1, 3 Page 123 (1956)] as follows:

$$\frac{1}{T_g} = \frac{w_1}{T_{g(1)}} + \frac{w_2}{T_{g(2)}}$$

For a copolymer, $w_1$ and $w_2$ refer to the weight fraction of the two comonomers, based on weight of monomers charged to the reaction vessel, and $T_{g(1)}$ and $T_{g(2)}$ refer to the glass transition temperatures of the two corresponding homopolymers in degrees Kelvin. For polymers containing three or more monomers, additional terms are added ($w_n/T_{g(n)}$). The glass transition temperatures of homopolymers for the purposes of this invention are those reported in "Polymer Handbook", edited by J. Brandrup and E. H. Immergut, Interscience Publishers, 1966, unless that publication does not report the Tg of a particular homopolymer, in which case the Tg of the homopolymer is measured by differential scanning colorimetry (DSC). To measure the glass transition temperature of a homopolymer by DSC, the homopolymer sample is prepared and maintained in the absence of ammonia or primary amine. The homopolymer sample is dried, preheated to 120° C., rapidly cooled to −100° C., and then heated to 150° C., at a rate of 20° C./minute while data is collected. The glass transition temperature for the homopolymer is measured at the midpoint of the inflection using the half-height method.

The Fox calculation of the $T_g$ for a copolymer containing crosslinking monomers as polymerized units, is based on glass transition temperatures for the homopolymers formed from each crosslinking monomer wherein the homopolymer is not in the presence of ammonia or a primary amine. The glass transition temperature values for homopolymers formed from the anionic monomers are for anionic homopolymers in the acid form.

The polymer composition (ii) is described in greater detail in U.S. Pat. No. 4,141,935 that we incorporate by reference herein.

The alkyl acrylate of this invention may be selected from a monomer group of acrylic acid esters having an alkyl group of 1 to 8 carbon atoms, for example, methyl acrylate, ethyl acrylate, propyl acrylate, butyl acrylate, 2-ethylhexyl acrylate, and n-octyl acrylate and combinations thereof.

The substituted styrenes include α-methylstyrene, vinyl toluene, halostyrene, t-butyl styrene and the like. The substituted acrylonitriles include methacrylonitrile, a-methylene glutaronitrile, a-ethylacrylonitrile, a-phenylacrylonitrile and the like.

Crosslinking monomers include difunctional or bifunctional crosslinking monomers that is, monomers containing two reactive functional groups as well as crosslinking monomers containing more than two reactive functional groups such as ethylene glycol di(meth)acrylate, 1,3-butylene glycol di(meth)acrylate, 1,4-butylene glycol di(meth)acrylate, propylene glycol di(meth)acrylate; polyvinylbenzene such as divinylbenzene or trivinylbenzene or as a mixture thereof. Graftlinking monomers comprise copolymerizable allyl, methally, or crotyl esters of α,β-unsaturated carboxylic acids or diacids. Preferred graftlinking monomers are the allyl esters of acrylic acid, methacrylic acid, maleic acid and fumaric acid.

Thermoplastic polyurethane (TPU) is a polymer with diisocyanate component, polyol component, and chain extender produced by known method to possess urethane linkages in the main chain of the polymer molecule. Diisocyanate can be aliphatic type diisocyanate, cycloaliphatic diisocyanate, and aromatic type diisocyanate. Polyol contains active end hydrogen atoms and can be polyetherpolyol, polyesterpolyol, acrylic, styrene, vinyl addition and/or dispersion polyol. Chain extender is a low molecular weight diol such as aliphatic glycol, aromatic glycol, 1,4-butanediol, 1,6-hexanediol, and bis(hydroxyethyl)hydroquinone.

Polyvinyl butyral (PVB) is an optically transparent polymer. It is produced by reacting polyvinyl alcohol (PVOH) with butyraldehyde usually in an aqueous medium under acidic conditions. The reaction mixture is neutralized and PVB polymer is isolated, stabilized, and dried. The polymer typically comprises 12 to 25 weight % hydroxyl (OH) groups (calculated as polyvinyl alcohol (PVOH)), and preferably 15 to 20 weight % OH groups as PVOH. In addition, the polymer optionally comprises 0.1 to 10 weight % residual ester (COOR) groups calculated as polyvinyl ester, for example, acetate; and preferably 0.1 to 3 weight % COOR groups where R is a lower alkyl group. The remainder of the polymer is acetal, preferably butyraldehyde acetal, but optionally including small amounts of other acetal groups, for example, 2-ethyl hexanal group.

Typically, PVB polymer has a weight average molecular weight greater than 70,000.

Polymeric impact resistant resins are added to one or more layers of the film of this invention as mentioned above. Such impact resistant resins include a wide variety of polymers containing elastomers, such as natural and synthetic rubber, acrylate rubbers, and terpolymers such as MBS (methylmethacrylate/butadiene/styrene).

Conventional additives may be incorporated into the acrylic resin prior to melt processing. The additives include, for example, lubricants, stabilizers, antiblocking agents, and processing aids. The stabilizers serve to prevent the breakdown of the acrylic polymers due to thermal, ultraviolet light-stimulated oxidative degradation, mechanical degradation and discoloration. Other additives may include, for example, colorants, inorganic pigments, polymeric or inorganic fillers and particulate extenders. Furthermore, for agriculture application purposes, additives include, for example, anti-dripping, anti-fogging, anti-fungal agents and antistatic, ultraviolet light block agents, optionally, light diffusing agents or modifiers.

Multilayer films of this invention can be made in several ways. One is a blown film method where the layers are co-extruded in tubular form, and the tube can be subsequently blown to form a larger bubble that is of film thickness. This blowing of the tube can be accomplished as the multilayer tube is exiting the extrusion die, in which case the blown tubular film is fed through nip rolls that rotate as a speed faster than the speed at which the tubular material exits the die so that the tube is stretched in the machine direction as the tube is being expanded in the transverse direction under air pressure. Typically, the expansion ratio between die annulus and diameter of the blown tube of film is 1.5 to 4 times the die diameter. The drawdown between the melt wall thickness and the cooled film thickness occurs in both radial and longitudinal directions and is easily controlled by changing the volume/pressure of air inside the bubble and by altering the haul off speed. This gives blown film a better balance of properties than traditional cast or extruded film which is drawn down along the extrusion direction only. another advantage of blown film process is that it could produce films with large width dimension (great than 30 feet wide) which is required by agricultural tunnel application.

Another variation of this method is to form the tube, cool it, then reheat it under internal air pressure to trap a bubble between two pairs of nip rolls where one pair pulls the tube at a faster rate than the other pair feeds the tube into the place between the two pairs of nip rolls. This pulling stretches the tube in the machine direction as the air pressure causes the tube to expand in the transverse direction. In other words, the film can be blown in a single step as the tube is being extruded from the die, or it can be done in several stages, with the tube being expanded in several stages until a tubular film is produced.

As second method is similar to the first except that the tube is not completely co-extruded. Instead, one or more layers are extruded in tubular form and one or more layers are then extrusion coated onto the tube to form a multilayer tube that is blown to form a large bubble that is of film thickness. This blowing also can be done in several stages until a tubular film is produced.

Other methods of making multilayer films include melt process methods such as film extrusion with a slot or flat die and those disclosed in the examples that follow.

EXAMPLES 1-3

An acrylic emulsion copolymer (polymer A) made consistent with example 1 of U.S. Pat. No. 4,141,935 was prepared. The emulsion was then spray dried using a lab spray dryer (NIRO Inc., Soeborg, Denmark) The resultant powder was then milled using a Collin Mill (W. H. Collin GmbH Maschienefabrik, Aichach, Germany) at 175° C. for 3 minutes. After the milling was completed, the molten polymer was stripped from the metal rolls and placed in a metal mold to press into thin film sheets with a thickness in the range from 150 μm to 300 μm. A CARVER press (Carver Press Inc., Menomonee Falls, Wis.) was used with an operating temperature of 185° C. and pressing conditions of 2.268 metric tons for 3 minutes, followed by 9.07 metric tons for 2 minutes, and a 5-minute cooling period (room temperature) at 9.07 metric tons. The stress at break, elongation at break of the films were measured and listed in Table 1.

The above powder was also blended with a plasticizer bis(2-ethylhexyl)phthlate (DEHP) and milled at 175° C. for 3 minutes. After the milling was completed, the molten polymer was stripped from the metal rolls and placed in a metal mold to press into thin film sheets with a thickness in the range from 150 μm to 300 μm. A CARVER press (Carver Press Inc., Menomonee Falls, Wis.) was used with an operating temperature of 185° C. and a pressing conditions of 2.268 metric tons for 3 minutes, followed by 9.07 metric tons for 2 minutes, and a 5-minute cooling period (room temperature) at 9.07 metric tons. The stress at break, elongation at break of the films were measured and listed in Table 1.

TABLE 1

Mechanical properties of polymer A and polymer A with DEHP
Tensile test (ISO 527-3/2/500)
(according to standards ISO527-3 and EN13206)
MTS 10MH (Lab N° 50)
Sample T2 (150 mm × 10 mm), cutted with cutter, speed: 500 mm/min

| | | Stress at break (Mpa) | | Elongation at break (%) | |
|---|---|---|---|---|---|
| ID | Films | average | std deviation | average | std deviation |
| 1 | 100% polymer A | 27.76 | 1.22 | 21.20 | 4.91 |
| 2 | 90% polymer A + 10% DEHP | 16.56 | 0.96 | 53.38 | 14.12 |
| 3 | 80% polymer A + 20% DEHP | 9.71 | 0.44 | 85.98 | 14.19 |

EXAMPLES 4-9

Pellets of Krystalgran PN 03-217 (Huntsman, Mich., USA) (TPU) was pressed to produce a thin film using the conditions described in examples 1-3. The resulting TPU film was then pressed along with the film from example 1 using the conditions described previously to produce a two-layer film with the structure of "TPU/polymer A". The tear resistance of the 2-layer film was performed by the following method (finger test) and the result was listed in Table 2. Pellets of Butocite from (DuPont Delaware, USA) (PVB) was pressed to produced a thin film using the method described above, the resulting PVB film was then pressed along with the film from example 1 to produced a three-layer film with the structure of "100% polymer A/PVB/100% polymer A". The tear resistance of the 3-layer film was performed by the following finger test method and the result was listed in Table 2. Films with the structure of "TPU/90% polymer A+10% DEHP", and "TPU/80% polymer A+20% DEHP" were also produced using the same manner as above and the film tear resistance results were listed in Table 2.

Tear Resistance Finger Test Method:

First, using a pair of scissors to place a 2-3 cm long cut at the center of one side of a film piece, then, using two hands to stretch the cuts at opposite directions to test the tear propagation resistance of the film. The higher the force required to propagate the tear, the better the film tear resistance. The "+" sign indicates the tear resistance of each film. For example, a film with tear resistance of three "+" signs should exhibit higher tear resistance than a film with tear strength of two "+" signs.

TABLE 2

Multilayer film compositions and tear resistance

| Reference | Film composition | Processing technique | Tear resistance (finger test) |
|---|---|---|---|
| 4 | TPU/100% polymer A | Press | ++ |
| 5 | TPU/90% polymer A + 10% DEHP | Press + Calender | ++ |
| 6 | TPU/80% polymer A + 20% DEHP | Press + Calender | +++ |
| 7 | 100% polymer A/PVB/ 100% polymer A | Press | + |

TPU: thermal plastic urethane, Krystalgran PN 03-217 of Huntsman (Michigan, USA)
PVB: polyvinylbutyral, Butocite of DuPont (Delaware, USA)

EXAMPLE 10

This example illustrates the preparation of a 2-stage acrylic polymer in an aqueous emulsion. The following mixtures were prepared with deionized water:

| Mixture | Component | Parts by Weight |
|---|---|---|
| | Stage I | |
| A | Water | 163.52 |
| | 23.40% Aqueous sodium dodecylbenzenesulfonate | 0.0962 |
| B | Ethyl acrylate | 69.86 |
| | Allyl Methacrylate | 0.1400 |
| | Sodium carbonate | 0.0071 |
| | 23.40% Aqueous sodium dodecylbenzenesulfonate | 1.28 |
| | Water | 28.40 |
| C | Sodium persulfate | 0.0420 |
| | Water | 8.27 |
| | Stage II | |
| D | Methyl methacrylate | 29.96 |
| | n-Dodecylmercaptan | 0.0450 |
| | Sodium carbonate | 0.0102 |
| | 23.40% Aqueous sodium dodecylbenzenesulfonate | 0.55 |
| | Water | 10.77 |

-continued

| Mixture | Component | Parts by Weight |
|---|---|---|
| E | Sodium persulfate | 0.0180 |
|   | Water | 5.43 |
| F | Sodium persulfate | 0.0090 |
|   | Water | 4.36 |

A reactor equipped with stirrer and condenser and blanked with nitrogen was charged with Mixture A. Into the stirred reactor heated to 80° C. were added 7.5% of Mixtures B and 20% of Mixture C. After an exothermic polymerization took place and the reactor reached peak temperature, the heating and stirring were continued at 80° C. for 10 minutes. The remaining Mixtures B and C were gradually added into the reactor in 90 minutes. After the addition was completed, the reactor was kept at 80° C. for 30 minutes. The particle size of the emulsion was 174 nm as measured by a Brookhaven Instruments particle size analyzer BI-90. Mixtures D and E were then gradually added into the reactor in 85 minutes. After the addition was completed, the reactor was raised to 85° C. Mixture F was gradually added into the reactor in 30 minutes before the reactor temperature was lowered to 80° C. The stirring and heating at 80° C. were continued for another 30 minutes before cooling the reactor to ambient temperature. The particle size of the resulting emulsion was 192 nm as measured by a Brookhaven Instruments particle size analyzer BI-90.

The above emulsion was spray dried using a lab spray dryer (NIRO Inc., Soeborg, Denmark), and generated polymer B powder. A powder blend containing 30% weight of polymer A powder made from example 1 and 70% weight polymer B powder was pelletized with a 30 mm twin screw extruder and 4 mm 2-strand die (Werner & Phleiderer, Ramsey, N.J.). The pelletizing conditions were: temperature was 200 C, feed rate was 20 lbs/hour, and RPM was 150. The pellets were co-extruded with a TPU with a weight average molecular weight of 143000 and number average molecular weight of 31000, and a refractive index of 1.50 using a coextrusion blown film line with a 30 mm die (Dr. Collin GmbH, Ebersberg, Germany) to produce a three layer film with a structure of acrylate/TPU/acrylate and a weight ratio of acrylate: TPU of 40 60. The film with a thickness of 125 micrometer exhibited a light transmission of great than 92%, a tear propagation resistance (ASTM D1938) of 28.5 kg/cm, a tensile strength (ASTM D882) of 5077 psi and elongation of 419%.

EXAMPLE 11

Powder of polymer A made from example 1 was pelletized with the conditions described in example 10. The resulting pellets were co-extruded with the same TPU and under the same process conditions and the same coextrusion blown film line as example 10. A three layer film with a thickness of 90 μm and a structure of acrylate (30 μm)/TPU (30 μm)/acrylate (30 μm) was produced. The light transmission of the film is great than 92%, a tear propagation resistance (ASTM D1938) was 8.08 kg/cm, a tensile strength (ASTM D882) was 4339 psi and elongation was 128%.

We claim:

1. A multilayer film comprising:
    (a) a first outer layer comprising a polymer composition selected from groups (i) or (ii) below or combinations of (i) and (ii), wherein
    composition (i) comprises from about 10 to 96 weight percent of a (co)polymer of 80 to 100 mole percent $C_1$ to $C_4$ alkyl methacrylate and from 0-40 mole percent of a monomer selected from $C_1$ to $C_8$ alkyl acrylate, styrene, substituted styrene, acrylonitrile, substituted acrylonitrile or combinations thereof, and about 90 to 4 weight percent of an impact resistant resin;
    composition (ii) comprises a first through a fourth stage polymer composite wherein the first elastomeric, relatively soft first-stage polymer is polymerized from an aqueous emulsified monomer system containing from about 75-99.8 weight percent of at least one $C_1$ to $C_8$ alkyl acrylate and about 0.1-5 weight percent of at least one crosslinking polyethylenically unsaturated monomer, the balance to total 100 weight percent of first-stage monomer system comprising one or more copolymerizable monoethylenically unsaturated monomers, and the monomer system being chosen so that the maximum glass transition temperature is not over –20° C.;
    the second-stage polymer is polymerized, in the presence of the resultant aqueous system from the first-stage polymerization, from an aqueous emulsified monomer system containing about 10-90 weight percent of at least one $C_1$ to $C_8$ alkyl acrylate, and 9-89.9 weight percent of at least one $C_1$ to $C_4$ alkyl methacrylate;
    wherein the third-stage polymer is polymerized, in the presence of the resultant aqueous system from the second-stage polymerization from an aqueous emulsified monomer system containing about 5-40 weight percent of at least one $C_1$ to $C_8$ alkyl acrylate and about 95-60 weight percent of at least one $C_1$ to $C_4$ alkyl methacrylate; and
    the fourth-stage polymer is polymerized, in the presence of the resultant aqueous system from the third-stage polymerization, from an aqueous emulsified monomer system containing about 80-100% weight percent of at least one $C_1$ to $C_4$ alkyl methacrylate and the balance, to total 100 weight percent of the fourth-stage monomer system, of at least one $C_1$ to $C_8$ alkyl acrylate; the weight of the first-stage monomer system being about 10-75% of the total weight of the polymer composition and the weight of the subsequent stages being about 90-25% of the total weight of the polymeric composition, wherein into each of the first- and second-stage monomer systems from about 0.1 to 1 weight percent of at least one graftlinking monomer is incorporated wherein the graftlinking monomer is a copolymerizable monomer containing at least two addition polymerizable unsaturated functional groups, each of which polymerize at substantially different rates with respect to each other;
    (b) a core layer selected from a thermoplastic polyurethane ("TPU") or polyvinyl butryal ("PVB"); and
    (c) a second outer layer selected from (i) or (ii) or combinations thereof;
    wherein the multilayer film has a total thickness of less than about 300 micrometers.

2. A multilayer film of claim 1 wherein the thickness of the outer acrylic layer is from 20 micrometer to 100 micrometer, and the thickness of the middle TPU or PVB layer is from 20 to 200 micrometer.

3. The multilayer film of claim 1 wherein each of the first and second outer layers further comprises a plasticizer.

4. The multilayer film of claim 1 further comprising an ultraviolet light absorber, a light stabilizer, and an antidrip agent.

5. A greenhouse or agricultural tunnel covered with a multilayer film of claim 1.

* * * * *